(12) United States Patent
Steck et al.

(10) Patent No.: US 11,081,741 B2
(45) Date of Patent: Aug. 3, 2021

(54) BATTERY MODULE AND BATTERY

(71) Applicants: Dr. Ing. h.c. F. Porsche Aktiengesellschaft, Stuttgart (DE); AUDI AG, Ingolstadt (DE)

(72) Inventors: Armin Steck, Kusterdingen (DE); Felix Brendecke, Ditzingen-Hirschlanden (DE); Johannes Foth, Manching (DE); Tamas Gyulai, Munich (DE)

(73) Assignees: Dr. Ing. h.c. F. Porsche Aktiengesellschaft; Audi AG

( * ) Notice: Subject to any disclaimer, the term of this patent is extended or adjusted under 35 U.S.C. 154(b) by 148 days.

(21) Appl. No.: 15/658,784

(22) Filed: Jul. 25, 2017

(65) Prior Publication Data

US 2018/0034120 A1   Feb. 1, 2018

(30) Foreign Application Priority Data

Aug. 1, 2016   (DE) .......................... 102016009212.2

(51) Int. Cl.
*H01M 10/625* (2014.01)
*H01M 10/6556* (2014.01)
(Continued)

(52) U.S. Cl.
CPC ........... *H01M 10/625* (2015.04); *B60L 50/64* (2019.02); *B60L 58/26* (2019.02); *H01M 10/627* (2015.04);
(Continued)

(58) Field of Classification Search
CPC ............. H01M 2/1072; H01M 10/655; H01M 10/6554; H01M 10/6556; B60L 50/64
See application file for complete search history.

(56) References Cited

U.S. PATENT DOCUMENTS 8,830,676 B2   9/2014  Borck et al.
8,889,283 B2  11/2014  Marchio et al.
(Continued)

FOREIGN PATENT DOCUMENTS

DE   102009018787 A1   10/2010
DE   102010028191 A1   10/2011
(Continued)

OTHER PUBLICATIONS

German Search Report for German Application No. 10 2016 009 212.2, dated May 5, 2017 with partial translation—8 Pages.
(Continued)

*Primary Examiner* — Stephan J Essex
(74) *Attorney, Agent, or Firm* — RatnerPrestia

(57) ABSTRACT

A battery module includes a plurality of individual electrical cells which are arranged within a common housing, wherein an end side of the housing has mechanical connecting elements for connecting the battery module to a temperature-control element which is provided outside the battery module in order to thereby enable good heat transfer between the battery module and the temperature-control element. The mechanical connecting elements are provided as corresponding upper and lower cutouts in the end side of the housing, which upper and lower cutouts are connected to one another by a through-passage, for receiving a connector of which the head can be positioned in the one cutout. The connector can extend vertically along the through-passage and can be connected to a mating piece which can be positioned at least partially in the other cutout and is fixedly connected to the temperature-control element.

18 Claims, 2 Drawing Sheets

Figure 1:
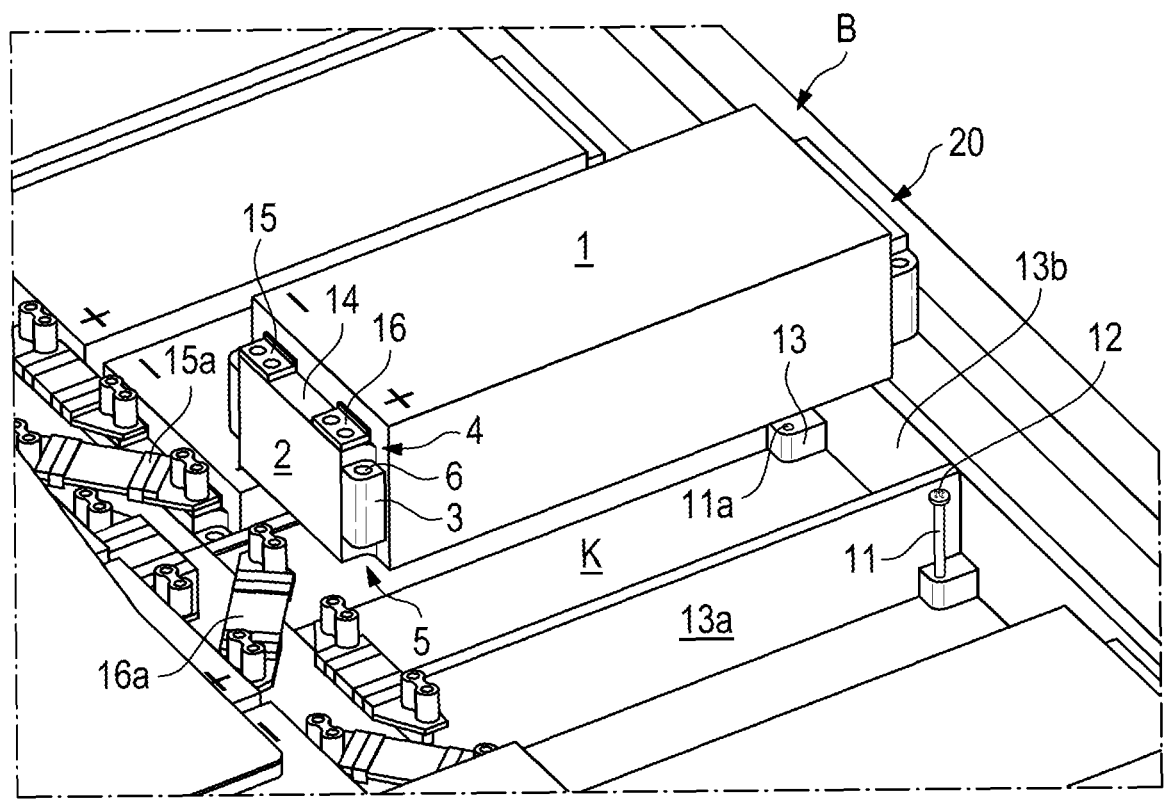

(51) Int. Cl.
*H01M 2/10* (2006.01)
*H01M 10/627* (2014.01)
*B60L 58/26* (2019.01)
*B60L 50/64* (2019.01)
*H01M 50/20* (2021.01)

(52) U.S. Cl.
CPC ....... *H01M 10/6556* (2015.04); *H01M 50/20* (2021.01); *B60L 2240/545* (2013.01); *H01M 2220/20* (2013.01); *Y02T 10/70* (2013.01)

(56) References Cited

U.S. PATENT DOCUMENTS

| | | | |
|---|---|---|---|
| 9,478,810 B2 | 10/2016 | Gendlin et al. | |
| 2012/0183823 A1 | 7/2012 | Von Borck et al. | |
| 2012/0188714 A1* | 7/2012 | Von Borck | H01M 2/1061 361/688 |
| 2014/0120407 A1* | 5/2014 | Hofer | H01M 2/206 429/159 |
| 2014/0356684 A1 | 12/2014 | Lim | |
| 2015/0037662 A1* | 2/2015 | Pinon | H01M 2/0237 429/179 |
| 2015/0280190 A1* | 10/2015 | Ohshiba | H01M 10/658 429/53 |
| 2015/0349394 A1 | 12/2015 | Hayashida et al. | |
| 2016/0133997 A1 | 5/2016 | Vejalla et al. | |
| 2017/0110698 A1* | 4/2017 | Kim | H01M 2/1077 |
| 2017/0194676 A1* | 7/2017 | Omura | H01M 10/613 |

FOREIGN PATENT DOCUMENTS

| | | |
|---|---|---|
| DE | 112012000438 T5 | 10/2013 |
| DE | 102013021232 A1 | 6/2015 |
| DE | 102015118974 A1 | 5/2016 |

OTHER PUBLICATIONS

Chinese Office Action for Chinese Application No. 201710629163.X, dated Nov. 29, 2019, with translation, 12 pages.

* cited by examiner

BATTERY MODULE AND BATTERY

CROSS-REFERENCE TO RELATED APPLICATION

This application claims priority to German Patent Application No. DE 10 2016 009 212.2, filed Aug. 1, 2016, the content of such application being incorporated by reference herein in its entirety.

FIELD OF THE INVENTION

The invention relates to a battery module comprising a plurality of individual electrical cells which are arranged within a common housing. The invention also relates to a battery having corresponding battery modules.

BACKGROUND OF THE INVENTION

DE 10 2009 018 787 A1, which is incorporated by reference herein, discloses a battery module which comprises a plurality of individual electrical cells which are arranged within a common housing. In said document, the housing is of two-part design, wherein the lower part has threaded inserts, which correspond to bores in the upper part, for screw-connection of the two parts of the housing. In addition, the battery module has an electrical connection which is accessible from above but, on account of a step in the battery module, is arranged below the upper side of the battery module. A temperature-control element is provided within the housing for temperature-control purposes.

DE 11 2012 000 438 T5, which is incorporated by reference herein, which forms the generic type likewise describes a battery module comprising a plurality of individual electrical cells which are arranged within a common housing. In said document, an end side of the housing has mechanical connecting elements for connecting the battery module to a temperature-control element which is provided outside the battery module in order to thereby enable good heat transfer between the battery module and the temperature-control element. The connecting elements between the battery module and the temperature-control element, which is provided to the side of said battery module, are designed as respectively corresponding male and female connecting elements in this case.

SUMMARY OF THE INVENTION

A connection of the battery module to the temperature-control element, which is provided outside the battery module, is configured such that the required installation space, in particular in respect of its height, is minimized.

Described herein is a battery module comprising a plurality of individual electrical cells which are arranged within a common housing, wherein an end side of the housing has mechanical connecting elements for connecting the battery module to a temperature-control element which is provided outside the battery module in order to thereby enable good heat transfer between the battery module and the temperature-control element, wherein the mechanical connecting elements are provided as corresponding upper and lower cutouts in the end side of the housing, which upper and lower cutouts are connected to one another by means of a through-passage, for receiving a connecting means of which the head can be positioned in the one cutout, which connecting means can extend vertically along the through-passage and can be connected to a mating piece which can be positioned at least partially in the other cutout and is fixedly connected to the temperature-control element.

One advantage of the battery module according to aspects of the invention is that it can be connected to different temperature-control elements in a particularly simple manner. Therefore, the temperature-control element can be provided, for example, below the battery module. As an alternative, the temperature-control element can be provided on the base and also on the left-hand and/or right-hand side of the battery module. In addition, the size of the temperature-control element can differ from the size of the battery module in the connecting region. In order to be able to connect the battery module according to aspects of the invention to the temperature-control element, only one mating piece is required, which is fixedly connected to the temperature-control element and which is connected to the connecting elements on the end side of the housing by means of the connecting means. Given a corresponding configuration of the housing, that is to say given a thermally conductive design of at least that side face which is intended to be connected to the temperature-control element, good heat transfer between the battery module and a temperature-control element is made possible in this way. In this case, the temperature-control element can be in the form of a cooling element, in the form of a heating element or in the form of a combination of the two.

The positional terms such as above, below etc. used here and below are intended to always relate to the installation position of the battery module, that is to say to the state after insertion of the battery module into the battery which is formed from all of these battery modules, in this case. The term end side is intended to denote a side face of the housing of the battery module, in particular the side face with the smallest surface area. Furthermore, cutout denotes a small surface which, as seen from a surrounding surface, is recessed in relation to said surrounding surface.

A further advantage of the solution according to aspects of the invention is that the combination of the battery module and the temperature-control element can be minimized in respect of its height when the temperature-control element is provided above or below the battery module. This is because the mating piece, which is fixedly connected to the temperature-control element, can be positioned at least partially in the one cutout, whereby, as seen in the vertical direction, no additional installation space is required for connecting the temperature-control element to the battery module. Since, in addition, the head of the connecting means, for the purpose of connecting the battery module to the temperature-control element, can be positioned in the other cutout, the connecting means also does not protrude beyond the respective side face of the battery module when said battery module is connected to the temperature-control element.

The battery module according to aspects of the invention can particularly advantageously be used in a battery which, for the purpose of insertion of the respective battery modules, has a number of chambers which are open only on one side, wherein the side faces of the chambers are at least partially in the form of temperature-control elements. Here, the battery modules only need to be inserted into the chambers and accordingly connected to the connecting means in order to enable a fixed fit and, at the same time, good heat transfer between the battery module and the temperature-control element.

It is advantageously proposed to provide respectively upper and lower cutouts on the left-hand and/or right-hand edge of the end side of the battery module. This results in a particularly stable fit of the battery module on the temperature-control element, whereby a good thermal connection between the two is achieved.

The battery module preferably has a step in the upper or in the lower region of the end side, at least one electrical pole contact of the battery module being arranged on said step in the horizontal direction in such a way that said electrical pole contact is positioned above or below the or each upper or lower cutout in terms of height. In other words, the or each electrical pole contact is arranged next to the cutouts but higher or lower than said cutouts here. In this case, the or each electrical pole connector, which makes electrical contact with the or each electrical pole contact of the battery module, can each be guided over the head of the connecting means. Therefore, an installation space, which is of limited height, for the battery module can be used in an optimum manner by virtue of the pole connector not protruding beyond the top or bottom side of the battery module.

A particularly stable fit of the battery module is achieved when the other end side of the battery module which is opposite the first end side also has corresponding upper and lower cutouts, which are connected to one another by means of a through-passage, for receiving a connecting means of which the head can be positioned in the one cutout and which connecting means can extend vertically along the through-passage and can be connected to a mating piece which can be positioned at least partially in the other cutout and is fixedly connected to the temperature-control element.

In an advantageous embodiment of the invention, the connecting means are in the form of screws, wherein the connectable mating piece in each case has a corresponding threaded insert. This enables particularly cost-effective implementation.

It is advantageously proposed to provide the temperature-control element below and/or next to the battery module. In this way, the battery module can be used in a manner which is optimally matched to the respective installation space requirements.

BRIEF DESCRIPTION OF THE DRAWING FIGURES

The invention will be explained in greater detail below with reference to a drawing.

Figure 2:
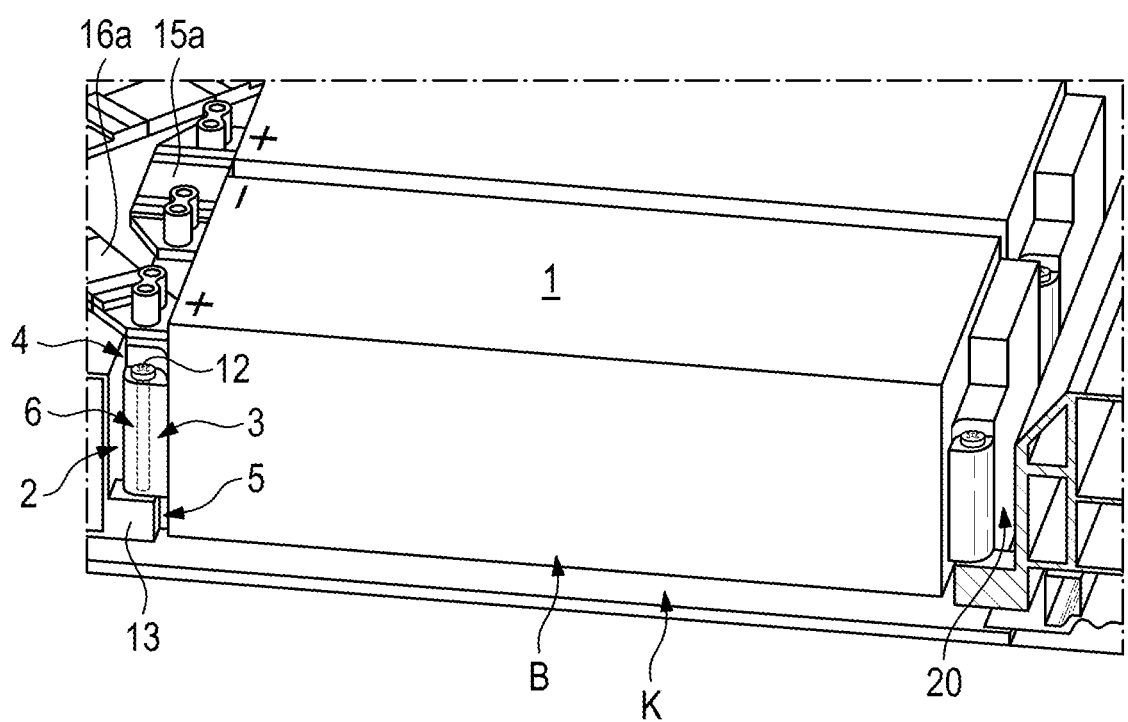

In the drawing:

FIG. 1 shows an exploded illustration with a battery module according to aspects of the invention before connection to a temperature-control element; and FIG. 2 shows a battery module according to aspects of the invention after connection to a temperature-control element.

DETAILED DESCRIPTION OF THE INVENTION

According to FIG. 1, a battery module B is illustrated together with further, identical battery modules as part of an underbody battery in an electrically driven motor vehicle. In said Figure, the underbody battery has side walls 13b which run in the longitudinal direction of the vehicle and intermediate walls 13a which run in the transverse direction of the vehicle.

A temperature-control element K which cools or controls the temperature of the battery modules B situated above it by means of a through-flowing fluid is provided below the side walls 13b and the intermediate walls 13a. The temperature-control element K has internal chambers, not illustrated, through which the fluid flows. The top side of the temperature-control element K is fixedly connected, for example welded, to the bottom side of the longitudinal walls 13b and the intermediate walls 13a. In this way, chambers are respectively formed, the base of said chambers being illustrated by the surface of the temperature-control element K, and the side walls of said chambers respectively being formed by sections of two intermediate walls 13a and of two longitudinal walls 13b.

Mating pieces 13 are then arranged in the respective corners of said chambers. The mating pieces 13 each have a height which is substantially lower than the height of the intermediate walls 13a or the longitudinal walls 13b. In addition, a threaded insert 11a is provided on the top side of the mating pieces 13 in each case.

The housing 1 of the battery module has a front end side 2 and a rear end side 20. The two end sides each have upper cutouts 4 and lower cutouts 5 on their left-hand and right-hand side. Said cutouts are connected to one another by means of a through-passage 6 in each case.

The front end side 2 additionally has a step 14. The step 14 is recessed in relation to the top side of the housing 1 and is fitted with two electrical pole contacts 15, 16. The electrical pole contacts 15, 16 provide electrical access to the individual electrical cells in the interior of the battery module B. The electrical pole contacts 15, 16 can be electrically connected to further battery modules by corresponding electrical pole connectors 15a, 16a in each case. In this case, the height of the step 14 is selected in such a way that, given fixed pole connectors 15a, 16a, said fixed pole connectors do not come to lie higher than the top side of the housing 1.

According to FIG. 2, the battery module B is connected to the mating pieces 13 by means of connecting means 11 in the form of screws. To this end, the battery module B is positioned in such a way that all four through-passages 6 are each arranged exactly above the corresponding threaded inserts 11a in the mating pieces 13. As a result, one screw 11 can extend along the through-passages 6 in each case and be screw-connected by means of the corresponding threaded insert 11a.

This produces a secure fit of the battery module B with respect to the temperature-control element K. Since all four screws 11 now reliably fasten a respective corner of the housing 1, a particularly good thermal connection is produced between the temperature-control element K and the base of the battery module B. Therefore, when the battery module B is in the installed state, good heat transfer is ensured between said battery module and the temperature-control element K.

In this case, the housing 1 of the battery module B is manufactured from a thermally conductive material, for example from metal. This produces a structure of the underbody battery which is optimized in respect of height. This is because, when the battery module B is in the installed state, the pole connectors 15a, 16a do not protrude beyond the top side of the battery module B. The respective heads of the screws 11 are arranged within the cutouts 4 in this case. Owing to the step 14 on the end side 2, the cutout 4 now comes to lie below the planar surface of the step 14 in each case. Since the depth of the cutout 4 is selected to be greater than the height of the head 12 of the screw 11, the respective pole connector 15a, 16a now reliably passes over the screw 11.

The mating piece 13, for the purpose of screwing the screw 11 with the aid of the threaded insert 11a, is positioned substantially in the lower cutout 5. Therefore, the required height for installing the battery module 1 can be minimized.

What is claimed is:

1. A battery module comprising:

a plurality of individual electrical cells which are arranged within a common housing, wherein an end side of the common housing has mechanical connecting elements for connecting the battery module to a temperature-control element which is provided outside the battery module in order to thereby enable good heat transfer between the battery module and the temperature-control element, wherein the mechanical connecting elements are provided as corresponding upper and lower cutouts in the end side of the housing, wherein the battery module has a step in an upper or in a lower region of the end side, two electrical pole contacts of the battery module being arranged on said step in a horizontal direction in such a way that said electrical pole contacts are positioned either above or below the or each upper or lower cutout, and the electrical pole contacts being arranged at least partially outside of the common housing of the battery module, wherein the two electrical pole contacts are spaced apart from each other, positioned on opposite sides of the step and disposed on the end side of the common housing, wherein the battery module has two electrical pole connectors that are respectively connected to the electrical pole contacts and extend from the housing for connecting to further battery modules, wherein one of the two electrical pole connectors is configured to be connected to an adjacent battery module arranged beside the battery module, and the other of the two electrical pole connectors is configured to be connected to an opposing battery module arranged opposite the battery module, wherein said other of the two electrical pole connectors has an elongated and straight body that extends at an acute angle with respect to said one of the two electrical pole connectors and said battery module.

2. The battery module as claimed in claim 1, wherein the cutouts are provided on the left-hand or right-hand edge of the end side.

3. The battery module as claimed in claim 1, wherein the temperature-control element is provided either below or next to the battery module.

4. An underbody battery in an electrically driven motor vehicle, having battery modules as claimed in claim 1.

5. The battery module as claimed in claim 1, wherein an entirety of each electrical pole connector is disposed beneath a top side of the housing.

6. The battery module as claimed in claim 1, wherein said one of the two electrical pole connectors extends parallel to the end side of the common housing, and the other of the two electrical pole connectors extends outwardly from the common housing at an acute angle with respect to the end side of the common housing.

7. A battery assembly comprising the battery module of claim 1, the adjacent battery module, and the opposing battery module, and wherein the battery modules are interconnected by the electrical pole connectors.

8. The battery module as claimed in claim 7, wherein the battery module, the adjacent battery module, and the opposing battery module each have a long axis and a short axis that is transverse to the long axis, wherein the long axes of the battery module, and the adjacent battery module and the opposing battery module are oriented parallel to each other, wherein the short axes of the battery module, the adjacent battery module, and the opposing battery module are oriented parallel to each other, wherein the short axes of the battery module and the opposing battery module are spaced apart from each other in a direction of the lone axis of the battery module.

9. The battery module as claimed in claim 1, wherein said one of the two electrical pole connectors structurally differs from said other of the two electrical pole connectors.

10. The battery module as claimed in claim 1, wherein said other of the two electrical pole connectors extends further from the end side of the common housing than said one of the two electrical pole connectors.

11. The battery module as claimed in claim 1, wherein said end side of the common housing faces an end side of the opposing battery module.

12. The battery module as claimed in claim 11, wherein the upper and lower cutouts are connected to one another by a through-passage, the through-passage being configured for receiving a connecting means of which the head is configured to be positioned in one cutout of the upper and lower cutouts, which connecting means is configured to extend vertically along the through-passage and is configured to be connected to a mating piece which is configured to be positioned at least partially in the other cutout of the upper and lower cutouts and is fixedly connected to the temperature-control element.

13. The battery module as claimed in claim 12, wherein a second set of upper and lower cutouts are provided in another end side of the battery module, which second set of upper and lower cutouts are connected to one another by a second through-passage, for receiving a second connecting element of which the head of the second connecting element is configured to be positioned in one cutout of the second set of upper and lower cutouts, which second connecting element is configured to extend vertically along the second through-passage and is configured to be connected to a second mating piece which is configured to be positioned at least partially in the other cutout of the second set of upper and lower cutouts and is fixedly connected to the temperature-control element.

14. The battery module as claimed in claim 12, wherein the connecting means are in the form of screws, and the mating piece has a corresponding threaded insert.

15. The battery module as claimed in claim 12, wherein the step is a planar surface that extends between and interconnects the upper cutouts in the end side of the housing.

16. The battery module as claimed in claim 12, wherein the mating piece is positioned at least partially in the lower cutout and is fixedly connected to the temperature-control element.

17. The battery module as claimed in claim 12, wherein the head of the connecting means bears on a top surface of a protrusion of the housing through which the through-passage extends.

18. The battery module as claimed in claim 17, wherein the top surface of the protrusion and the head are positioned at an elevation beneath the step and the electrical pole contacts.

* * * * *